United States Patent
Bolz et al.

(10) Patent No.: US 6,344,015 B1
(45) Date of Patent: Feb. 5, 2002

(54) METHOD AND ARRANGEMENT FOR CONTROLLING THE DRIVE TRAIN OF A MOTOR VEHICLE

(75) Inventors: Martin-Peter Bolz, Buehl; Joachim Luh, Bietingheim-Bissingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/604,920

(22) Filed: Jun. 28, 2000

(30) Foreign Application Priority Data

Jun. 30, 1999 (DE) .......................................... 199 30 010

(51) Int. Cl.[7] .......................... B60K 41/04; F02D 45/00
(52) U.S. Cl. ........................................................ 477/111
(58) Field of Search ................................. 477/111, 107, 477/39, 83, 84

(56) References Cited

U.S. PATENT DOCUMENTS

| | | | | |
|---|---|---|---|---|
| 4,800,497 A | * | 1/1989 | Koori et al. ................... 701/67 |
| 5,109,818 A | * | 5/1992 | Yoshida ....................... 123/319 |
| 5,209,332 A | * | 5/1993 | Okayasu ..................... 192/69.4 |
| 5,983,563 A | * | 8/1999 | Nishio et al. ................ 477/117 |

* cited by examiner

Primary Examiner—Charles A Marmor
Assistant Examiner—Ankur Parekh
(74) Attorney, Agent, or Firm—Walter Ottesen

(57) ABSTRACT

The invention is directed to a method and an arrangement for controlling a drive train of a motor vehicle which includes at least: a motor, a transmission and a main clutch. The transmission is especially a transmission continuously variable with respect to its transmission ratio. Furthermore, at least two driving states of the drive train are provided which can be selected by the driver of the vehicle. The first driving state is provided in normal driving operation; whereas, in the second driving state, the force flow in the drive train is essentially interrupted. The essence of the invention is that the motor rpm is adjusted to the transmission input rpm in the second operating state wherein the force flow is essentially interrupted in the drive train. The vehicle speed can be considered as an additional criterion for adjusting the motor rpm. With the invention, it is possible to make the drive train so that it can transmit force during the travel of the vehicle without a noticeable jolt being perceived in the drive train.

13 Claims, 4 Drawing Sheets

METHOD AND ARRANGEMENT FOR CONTROLLING THE DRIVE TRAIN OF A MOTOR VEHICLE

BACKGROUND OF THE INVENTION

Methods and systems for controlling a drive train of a motor vehicle are known and are shown, for example, in the lower portion of FIG. 1. Here, the motor 15 is connected via a main clutch or converter-bridge clutch 16 and a transmission 17 to the drive wheels 18 of the vehicle. Here, it can also be provided that the main clutch 16 is mounted downstream of the transmission 17. The transmission 17 is a so-called CVT transmission which is continuously variable with respect to its transmission ratio. The motor 15, the main clutch 16 as well as the CVT transmission 17 are controlled by the corresponding controls 12, 13 and 14. Furthermore, at least the detection of the motor rpm Nmot and the transmission input rpm Nge is provided. In such CVT transmissions, the transmission ratio can be adjusted over a large range. The driver can, in general, select between the position N (neutral), the position P (park position) and the position D (drive stage) via a transmission selector. If the driver selects the position N (neutral), the main clutch 16 is opened and the force flow is essentially interrupted in the drive train. In the neutral position, a slight force flow can still be provided for safety.

If the main clutch 16 is closed while the vehicle is moving in that the driver switches from the position N (neutral) into the position D (drive stage), then a severe jolt can occur in the drive train of the vehicle because the main clutch 16 must again be closed and the transmission input rpm Nge and/or the clutch output rpm are not adapted to the motor rpm Nmot. Because of this instantaneous jolt, the vehicle can enter into an unstable driving condition under some circumstances.

Up to now, in general, the motor torque is not influenced when opening the main clutch of the transmission. Depending upon the position of the accelerator pedal actuated by the driver, a motor rpm adjusts which lies between the motor idle rpm and the breakaway rpm (maximum motor rpm). In general, the transmission control 14 then adjusts the transmission 17 in a direction of lower transmission ratios (low) or toward a transmission ratio which is determined from the driving program stored in the transmission control 14. The driving program is determined by means of the accelerator pedal position and the driving speed of the vehicle. When again engaging the main clutch 16, the jolt results from the typically high difference of the rpm at the two ends of the main clutch 16 and is therefore unavoidable in such systems.

In addition to the above-mentioned continuously variable transmissions (CVT transmissions), stepped transmissions are also known whose transmission ratio can be adjusted in a stepwise manner. Stepped transmissions are known as conventional fully automatic transmissions and automated shift transmissions.

SUMMARY OF THE INVENTION

It is an object of the invention to provide a jolt-free transition when closing the main clutch.

The method of the invention is for controlling the drive train of a motor vehicle. The drive train includes at least a motor having a motor output rpm, a transmission and a main clutch, the drive train having at least first and second operating states (D, N) selectable by the driver of the vehicle, the first operating state (D) being provided during normal driving operation and, during the second operating state (N), the force flow in the drive train being essentially interrupted. The method includes the steps of: detecting a motor rpm quantity (Nmot), which is representative of the motor output rpm, and detecting a transmission input rpm quantity (Nge), which is representative of the transmission input rpm; and, in the second operating state (N), adjusting the motor rpm quantity (Nmot) to the transmission input rpm quantity (Nge).

As mentioned, the invention proceeds from a method and an arrangement for controlling a drive train of a motor vehicle. The following are provided in the drive train: a motor, a transmission and a main clutch and the transmission is especially a transmission which is continuously variable with respect to its transmission ratio. The driver of the vehicle can select between different operating states of the drive train. In a first operating state, the normal driving operation is provided; whereas, in a second operating state, the force flow in the drive train is essentially interrupted. In addition to a complete interruption of the drive flow via a complete opening of the clutch, a low force flow can be provided in the second operating state (neutral position) for the reason of safety. Furthermore, the motor output rpm as well as the transmission input rpm are detected by corresponding rpm quantities.

The essence of the invention is that, in the second operating state, wherein the force flow in the drive train is essentially interrupted, the motor rpm is adjusted to the transmission input rpm. This affords the advantage that no large rpm differences are present at the clutch input and the clutch output when closing the main clutch. The closing of the main clutch can therefore take place essentially jolt free.

In an advantageous embodiment of the invention, it is provided to adjust the motor rpm to the transmission input rpm in such a manner that a desired value is formed in dependence upon the transmission input rpm. The motor rpm is then controlled to this desired value.

According to another feature of the invention, the vehicle longitudinal speed is detected by a corresponding quantity. The adjustment of the motor rpm to the transmission input rpm is then dependent upon whether the driving speed is greater or less than a pregiven threshold value. Here, it is especially provided that the adjustment of the motor rpm to the transmission input rpm takes place when the driving speed is greater than the threshold value. In this configuration of the invention, it is also provided that, in addition to the second operating state (no or only a slight force flow in the drive train, main clutch open or essentially open), the driving speed continues to be considered.

It can be especially provided that, when the driving speed is less than the threshold value, the motor rpm is adjusted in dependence upon the position of the accelerator pedal actuated by the driver. At low driving speeds (for example, less than 25 km/h), the driver must adjust a motor desired rpm with the accelerator pedal as when the vehicle is at standstill. In this low driving speed range, the transmission is adjusted in an advantageous manner only in a limited range so that the vehicle still exhibits an adequate acceleration capability when the gear is again engaged or when the main clutch is closed.

In a further advantageous embodiment of the invention, it is provided that the motor rpm quantity is limited to pregiven values when the driving speed is greater than the threshold value. This feature relates to the state which can occur at high driving speeds during opening of the main clutch. In this case, the motor rpm to be adjusted may not exceed the maximum motor rpm.

As already mentioned above, the main clutch is essentially opened in reaction to a change from the first operating state to the second operating state. If the change takes place from the second operating state to the first operating state (in general, this is effected by the driver), then the main clutch is actuated in the sense of a closing. Here, it can be especially provided that the closing takes place with maximum clutch adjusting speed. In this way, one achieves a very rapid restoration of the force flow without a noticeable jolt being felt in the drive train because the clutch input and clutch output speeds are essentially the same.

BRIEF DESCRIPTION OF THE INVENTION

The invention will now be describe with reference to the drawings wherein.

DESCRIPTION OF THE PREFERRED EMBODIMENTS OF THE INVENTION

Figure 1:
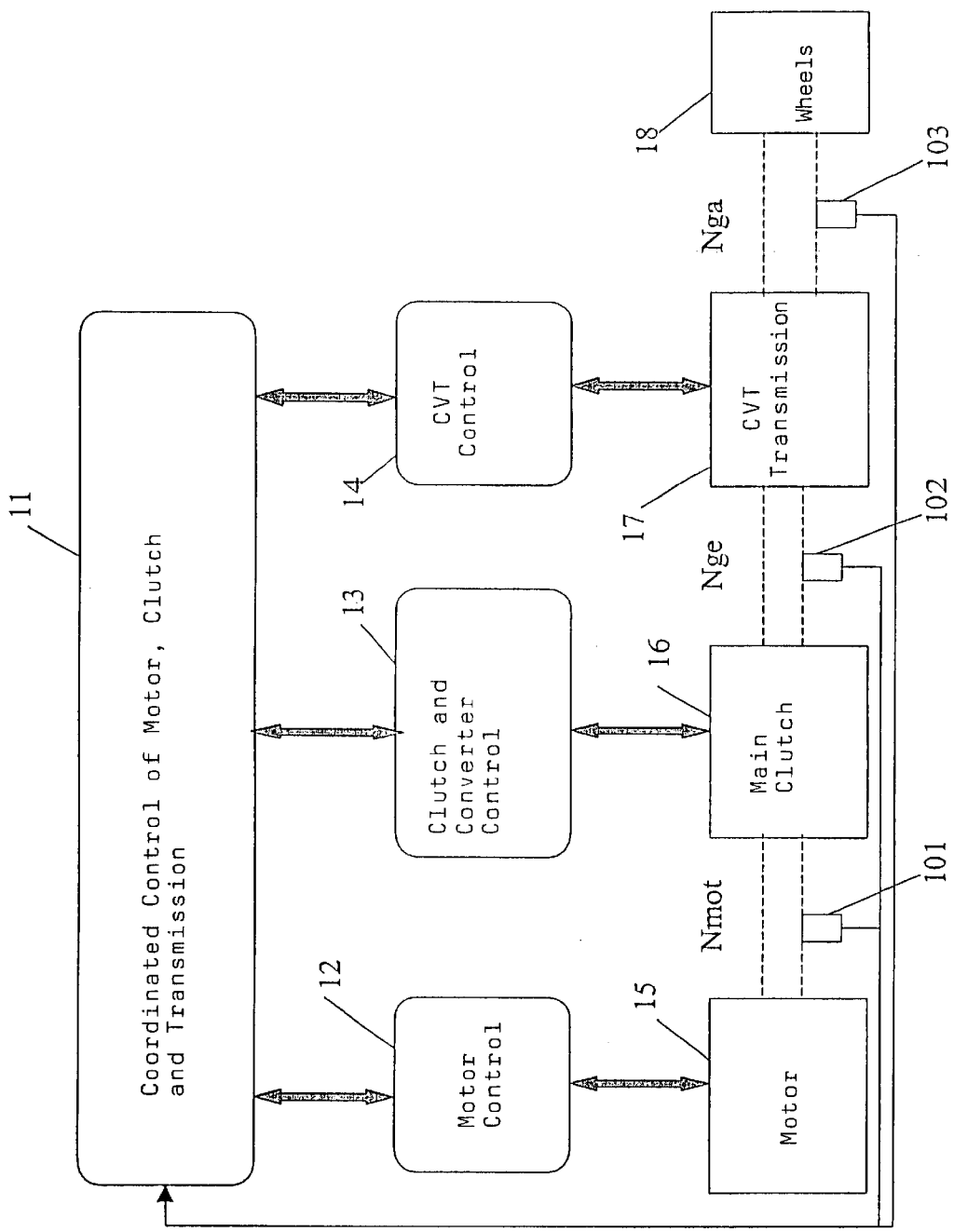
FIG. 1 shows an overview block circuit diagram of elements essential to the invention.

FIG. 1 was already described in part and shows the drive train of a motor vehicle in the lower part thereof. The drive train includes a motor 15, a main clutch or converter-bridge clutch 16, a CVT transmission 17 and drive wheels 18. The motor rpm Nmot, the transmission input rpm Nge and the transmission output rpm Nga are detected via rpm sensors 101, 102 and 103. The transmission output rpm Nga corresponds to the vehicle speed. These quantities are supplied to the coordinated control 11 of motor, clutch and transmission. In dependence upon these signals and additional quantities (not shown), the coordinated control 11 supplies desired values for the motor control 12, the clutch and converter control 13 as well as for the CVT control 14. These controls, in turn, supply the actuating signals to the corresponding actuating elements of the motor, the clutch and the transmission.

Figure 3:
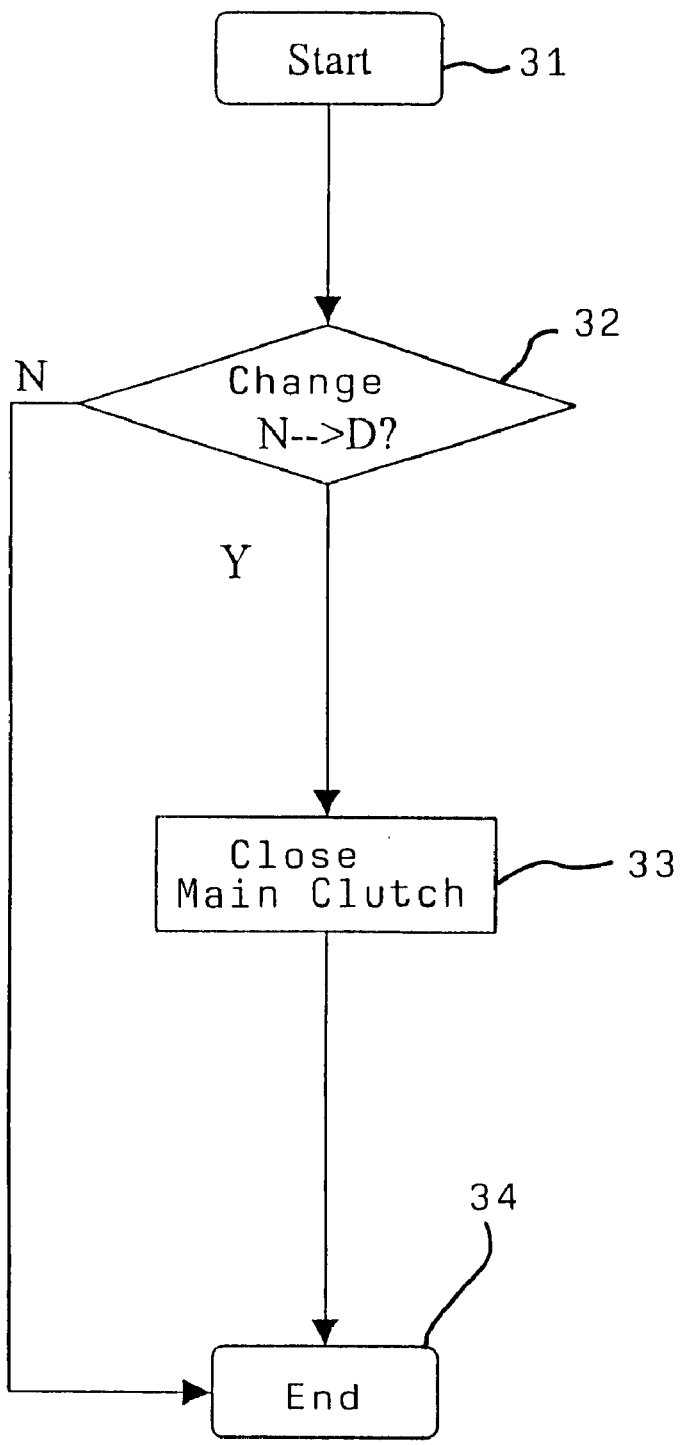
FIG. 3 is a flowchart showing a second embodiment of the method of the invention; and, FIG. 4 is a three-dimensional graph showing how the motor rpm input develops in dependence upon the accelerator pedal and/or in dependence upon the transmission ratio and the instantaneous driving speed.

As mentioned, the invention defines how the jolt during re-engagement of the clutch can be avoided in most cases or is at least greatly reduced via the coordinated control 11 of motor and transmission. In this connection, FIG. 3 will first be discussed.

After the start step 31, an inquiry is made in inquiry block 32 as to whether a change takes place from the operating state N (neutral, essentially no force flow in the drive train) to the operating state D (drive stage). If this is not the case, then this means that the drive stage N (neutral) is selected whereupon the program moves directly to the end step 34. However, if the change from N to D takes place, then the main clutch 16 is closed in step 33. This takes place, in general, with a maximum adjusting speed.

The change from N to D generally takes place first in that the main clutch is opened at any desired time point during the travel of the vehicle in that the driver changes the position of the selector lever from the position D (driving stage, main clutch closed) to the position N (neutral).

In the first instant after this adjustment, the rpms at both ends of the opened main clutch 16 are approximately the same. Via an rpm controller in the motor control 12, it is now ensured according to the invention that the rpms are or remain the same at both ends of the clutch 16. For this purpose, the transmission input rpm Nge is used as the desired value Nmot,des for the motor rpm controller. In this way, it is ensured that the rpm remains the same at both ends of the clutch 16.

Figure 4:
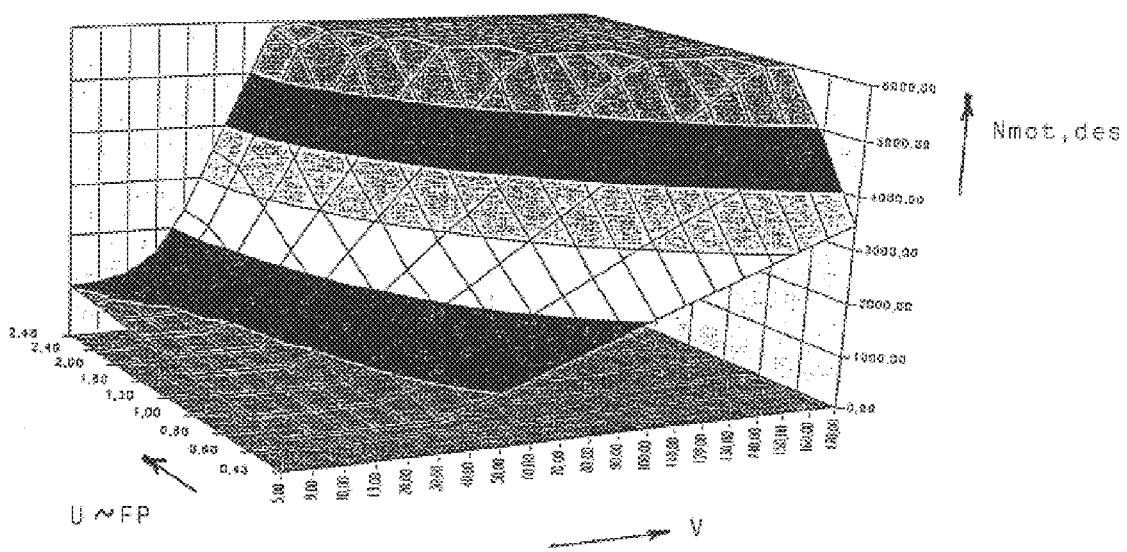

The accelerator pedal, which is adjustable by the driver, is interpreted during this rpm control as a desired value transducer for the transmission ratio U which is different than in other operating situations. FIG. 4 shows how the motor rpm input Nmotdes develops in dependence upon the position FP of the accelerator pedal and/or of the transmission ratio U, which is proportional thereto, and the instantaneous vehicle longitudinal speed V.

From FIG. 4, it can be seen that this scaling supplies satisfactory results only in the range of speeds from approximately 20 km/h to 90 km/h. At speeds lower than 25 km/h, the driver has to adjust a motor desired rpm with the accelerator pedal, as at standstill. In this low range of vehicle speed, the transmission 17 should only be adjusted in a limited region so that the vehicle still exhibits an adequate acceleration capacity when engaging the gear or when closing the main clutch.

At speeds greater than 60 km/h, the maximum value for the transmission ratio U (to which the accelerator pedal is scaled) must be so limited that the motor breakaway rpm (that is, the maximum permitted motor rpm) is not exceeded or falls just short thereof.

With the above-described measures, the driver always has the feel of influencing the motor with the accelerator pedal. This procedure will now be described in greater detail with respect to FIG. 2.

After the start step 21, a determination is made in inquiry block 22 as to whether the main clutch 16 is open (selector lever position N) or is closed. If the clutch is closed, then the program moves directly to the end step 27. However, if the clutch is open, then, in step 23, the detected vehicle speed V is compared to the threshold value SW. The vehicle longitudinal speed V can, for example, be determined from the transmission output rpm Nga (sensor 103).

If the vehicle longitudinal speed V drops below the threshold value SW, then, in step 24, the desired value Nmot,des is determined in dependence upon the accelerator pedal position FP. This is shown in block 24 with the function F.

Figure 2:
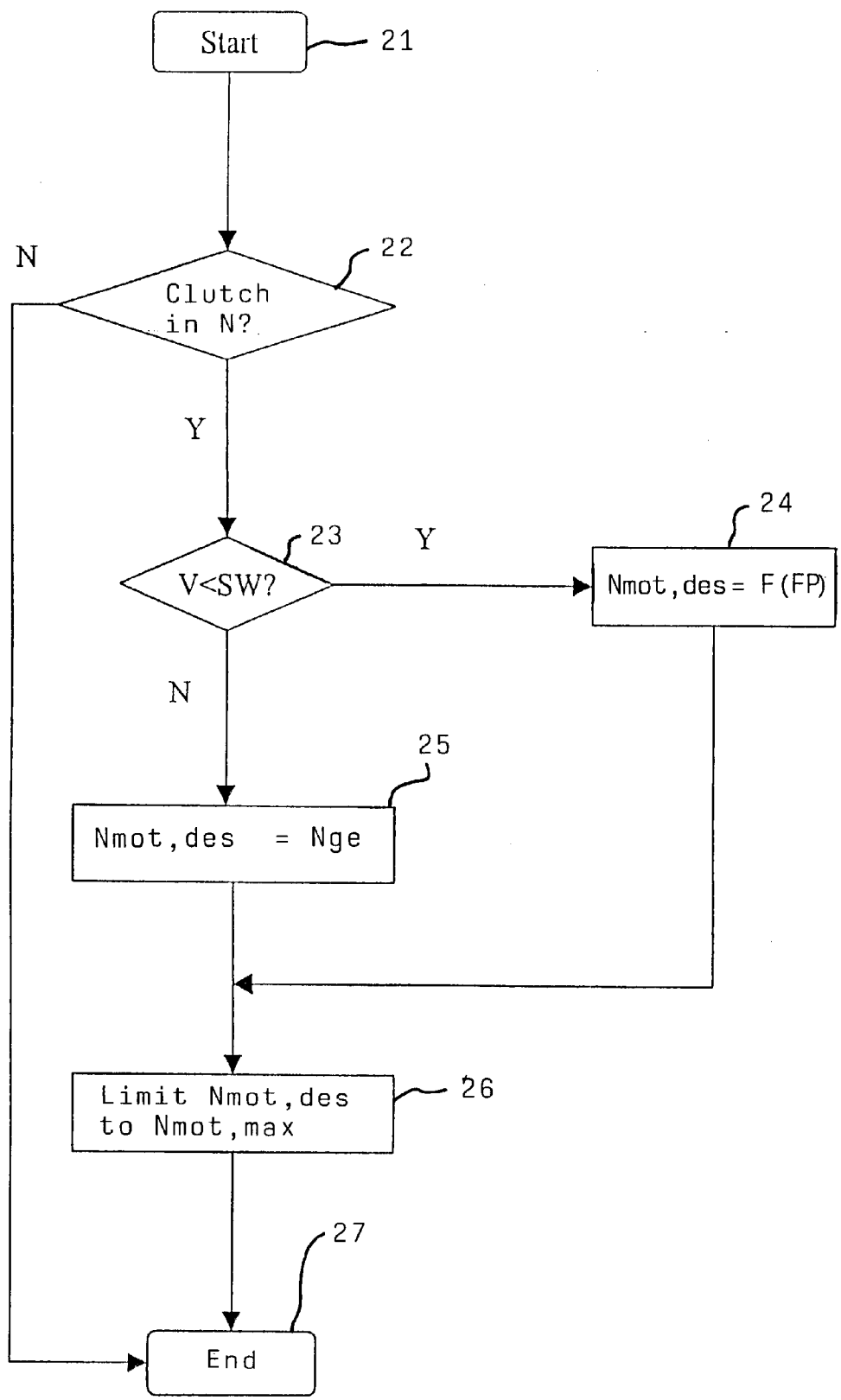
FIG. 2 is a flowchart showing an embodiment of the method of the invention.

However, if it is determined in step 23 that the vehicle longitudinal speed exceeds the threshold value SW, then, in step 25, the desired value Nmot,des for the motor output rpm is set equal to the sensor-detected transmission input rpm Nge. In step 26, it is ensured that the desired value Nmot,des for the adjustment of the motor output rpm is limited to a maximum value Nmot,max. After the end step 27, the sequence shown in FIG. 2 is restarted.

With the procedure according to the invention, a transition can be made from the driving stage N to the driving stage D during the travel of the vehicle so that the main clutch is closed with maximum speed independently of the particular driving speed then present. The motor rpm does not drop drastically when opening the main clutch because it is controlled in dependence upon the transmission input rpm. When the clutch is again engaged, no or only a slight torque jolt occurs in the drive train in accordance with the invention because the motor must be accelerated not at all or only by a small amount. By scaling the accelerator pedal position FP as a transmission desired ratio U, the driver has the feeling of controlling the motor notwithstanding the rpm control of the motor. Nonetheless, the drive train is continuously in a condition wherein it can be made to transmit force.

In addition to the above-mentioned continuously adjustable transmissions (CVT transmissions), stepped transmissions are known whose transmission ratio is adjustable in steps. Here, conventional fully automatic transmissions and automated shifting transmissions are known. The invention can also be applied to such transmissions.

It is understood that the foregoing description is that of the preferred embodiments of the invention and that various changes and modifications may be made thereto without departing from the spirit and scope of the invention as defined in the appended claims.

What is claimed is:

1. A method for controlling the drive train of a motor vehicle, the drive train including at least a motor having a motor output rpm, a transmission and a main clutch, the drive train having at least first and second operating states (D, N) selectable by the driver of the vehicle, the first operating state (D) being provided during normal driving operation and, during the second operating state (N), the force flow in the drive train being essentially interrupted, the method comprising the steps of:

detecting a motor rpm quantity (Nmot), which is representative of the motor output rpm, and detecting a transmission input rpm quantity (Nge), which is representative of the transmission input rpm; and, in said second operating state (N), adjusting the motor rpm quantity (Nmot) to said transmission input rpm quantity (Nge).

2. The method of claim 1, comprising the further steps of:

detecting a driving speed quantity (V) representative of the vehicle longitudinal speed;

making the adjustment of said motor rpm quantity (Nmot) to said transmission input rpm quantity (Nge) dependent on whether or not said driving speed quantity (V) is greater than or less than a pregiven threshold value (SW); and, adjusting said motor rpm quantity (Nmot) to said transmission input rpm quantity (Nge) when said driving speed quantity (V) is greater than said threshold value (SW).

3. The method of claim 1, comprising the further steps of:

adjusting the motor rpm quantity (Nmot) to said transmission input rpm quantity (Nge) in such a manner that a desired value (Nmot,des) is formed in dependence upon said transmission input rpm quantity (Nge); and, controlling said motor rpm quantity (Nmot) to the desired value.

4. The method of claim 2, comprising the further step of adjusting said motor rpm quantity (Nmot) in dependence upon the position (FP) of the accelerator pedal, which is actuated by the driver, when the driving speed quantity (V) is less than said threshold value (SW).

5. The method of claim 2, comprising the further step of limiting said motor rpm quantity (Nmot) to a pregiven value when said speed quantity (V) is greater than said threshold value (SW).

6. The method of claim 1, comprising the further step of essentially opening said main clutch in response to a change (D→N) from said first operating state to said second operating state.

7. The method of claim 6, comprising the further steps of:

actuating said main clutch in the sense of opening said main clutch in response to said change (D→N) from said first operating state to said second operating state; and, actuating said main clutch in a sense of closing said main clutch in response to a change (N→D) from said second operating state to said first operating state.

8. The method of claim 7, wherein said main clutch is closed with maximum speed.

9. The method of claim 1, wherein said transmission is a transmission which is continuously variable with respect to the transmission ratio thereof.

10. An arrangement for controlling the drive train of a motor vehicle, the drive train including at least a motor having a motor output rpm, a transmission and a main clutch, the drive train having at least first and second operating states (D, N) selectable by the driver of the vehicle, said first operating state (D) being provided during normal driving operation and, during the second operating state (N), the force flow in said drive train is essentially interrupted, the arrangement comprising:

first means for detecting a motor rpm quantity (Nmot) representative of the motor output rpm;

second means for detecting a transmission input rpm quantity (Nge) representing the transmission input rpm;

control means for adjusting said motor rpm quantity (Nmot) to said transmission input rpm quantity (Nge) when said drive train is in said second operating state (N).

11. The arrangement of claim 10, further comprising:

third means for detecting a driving speed quantity (V) representative of the vehicle longitudinal speed;

fourth means for making the adjustment of said motor rpm quantity (Nmot) dependent on said transmission input rpm quantity (Nge) whether or not said driving speed quantity (V) is greater than or less than a pregiven threshold value (SW); and, fifth means for adjusting said motor rpm quantity (Nmot) to said transmission input rpm quantity (Nge) when said driving speed quantity (V) is greater than said threshold value (SW).

12. The arrangement of claim 10, said arrangement functioning to do at least one of the following:

when said driving speed quantity (V) is less than said threshold value (SW), adjusting said motor rpm quantity (Nmot) in dependence upon the position (FP) of the accelerator pedal actuated by the driver; and, when said driving speed quantity (V) is greater than said threshold value (SW), limiting said motor rpm quantity (Nmot) to pregivable values.

13. The arrangement of claim 10, wherein said transmission is a transmission which is continuously variable with respect to the transmission ratio thereof.

* * * * *